US012598331B2

(12) United States Patent
Andreopoulos et al.

(10) Patent No.: US 12,598,331 B2
(45) Date of Patent: Apr. 7, 2026

(54) TRANSMITTING IMAGE DATA

(71) Applicant: Sony Interactive Entertainment Europe Limited, London (GB)

(72) Inventors: Ioannis Andreopoulos, London (GB); Odysseas Zisimopoulos, London (GB); Jia-Jie Lim, London (GB); Shakarim Soltanayev, London (GB); Alexis Lechat, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 324 days.

(21) Appl. No.: 18/137,352

(22) Filed: Apr. 20, 2023

(65) Prior Publication Data

US 2024/0276024 A1    Aug. 15, 2024

(30) Foreign Application Priority Data

Feb. 14, 2023    (GR) ............................... 20230100115

(51) Int. Cl.
| | |
|---|---|
| *H04N 19/86* | (2014.01) |
| *G06N 3/0464* | (2023.01) |
| *G06N 3/084* | (2023.01) |
| *H04N 19/154* | (2014.01) |
| *H04N 19/167* | (2014.01) |
| *H04N 19/172* | (2014.01) |
| *H04N 19/184* | (2014.01) |
| *H04N 19/42* | (2014.01) |
| *H04N 19/60* | (2014.01) |
| *H04N 19/80* | (2014.01) |

(52) U.S. Cl.
CPC ........... *H04N 19/86* (2014.11); *G06N 3/0464* (2023.01); *G06N 3/084* (2013.01); *H04N 19/154* (2014.11); *H04N 19/167* (2014.11); *H04N 19/172* (2014.11); *H04N 19/184* (2014.11); *H04N 19/42* (2014.11); *H04N 19/60* (2014.11); *H04N 19/80* (2014.11)

(58) Field of Classification Search
CPC ...................................................... H04N 19/86
USPC ..................................................... 375/240.18
See application file for complete search history.

(56) References Cited

U.S. PATENT DOCUMENTS

| | | | |
|---|---|---|---|
| 2012/0250757 A1 | 10/2012 | Mabey et al. | |
| 2022/0272355 A1* | 8/2022 | Singh ................... | H04N 19/186 |
| 2022/0392116 A1* | 12/2022 | Vembar ................. | G06N 3/045 |

(Continued)

OTHER PUBLICATIONS

Aizawa et al. "Model-Based Video Coding." Book. 1996. pp. 305-335. Kluwer Academic Publishers. Tokyo, Japan.

(Continued)

*Primary Examiner* — Yulin Sun
(74) *Attorney, Agent, or Firm* — Fish & Richardson P.C.

(57) ABSTRACT

A computer-implemented method of transmitting video data. A sequence of video frames is received. A warp operation for a first frame and a reference frame of the sequence of video frames is determined, wherein the warp operation defines a transformation of the reference frame to give an approximation of the first frame. One or more regions of interest of the first frame are identified. Encoded image data from the image data of the one of more regions of interest of the first frame is generated using an image encoder. The warp operation and the encoded image data are transmitted.

20 Claims, 15 Drawing Sheets

(56)                    References Cited

U.S. PATENT DOCUMENTS

2024/0013441 A1 *   1/2024   Le .............................. G06T 3/40
2024/0015318 A1 *   1/2024   Pourreza ............. H04N 19/172

OTHER PUBLICATIONS

Oquab et al. "Low Bandwidth Video-Chat Compression using Deep
Generative Models." E-Print. arXiv. 2020.
Pei et al. "Global Motion Estimation in Model-Based Image Coding
by Tracking Three-Dimensional Contour Feature Points." Book.
1998. pp. 181-190. vol. 8, No. 2. IEEE.
Extended European Search Report in European Appln. No. 23164204,
mailed on Aug. 24, 2023, 8 pages.

* cited by examiner

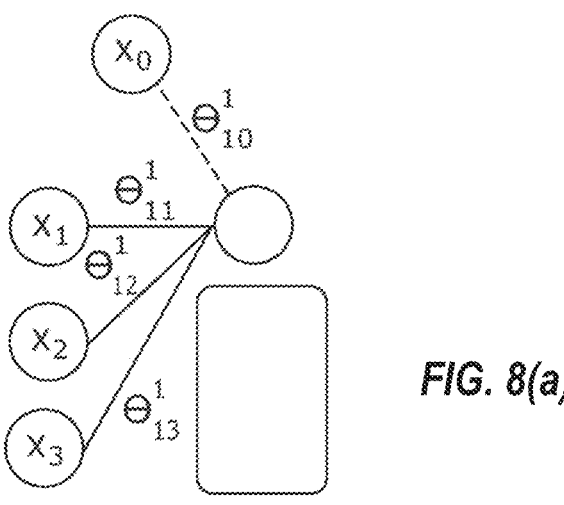

$$g(\Theta_{10}^{1}x_0 + \Theta_{11}^{1}x_1 + \Theta_{12}^{1}x_2 + \Theta_{13}^{1}x_3)$$

$\Theta_{13}^{1}$ means:

1 (superscript) - mapping from layer 1
1 - mapping to node 1 in layer 2 (L+1)
3 - mapping from node 3 in layer 1 (L)

*FIG. 8(a)*

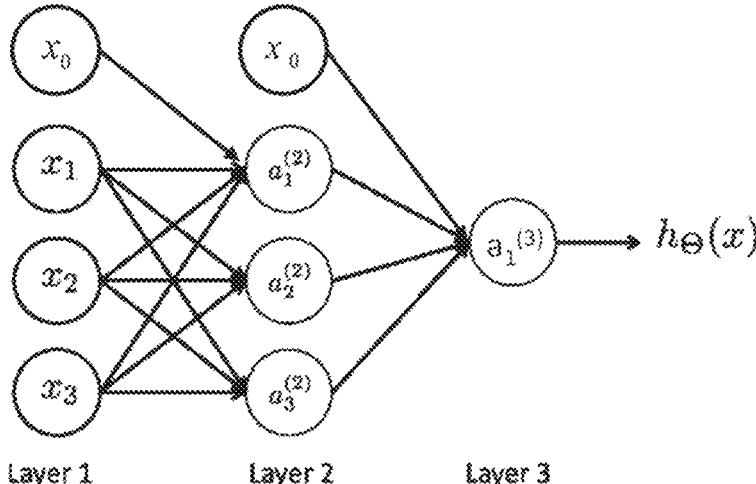

Layer 1          Layer 2          Layer 3

$$a_1^{(2)} = g(\Theta_{10}^{(1)}x_0 + \Theta_{11}^{(1)}x_1 + \Theta_{12}^{(1)}x_2 + \Theta_{13}^{(1)}x_3)$$
$$a_2^{(2)} = g(\Theta_{20}^{(1)}x_0 + \Theta_{21}^{(1)}x_1 + \Theta_{22}^{(1)}x_2 + \Theta_{23}^{(1)}x_3)$$
$$a_3^{(2)} = g(\Theta_{30}^{(1)}x_0 + \Theta_{31}^{(1)}x_1 + \Theta_{32}^{(1)}x_2 + \Theta_{33}^{(1)}x_3)$$
$$h_\Theta(x) = a_1^{(3)} = g(\Theta_{10}^{(2)}a_0^{(2)} + \Theta_{11}^{(2)}a_1^{(2)} + \Theta_{12}^{(2)}a_2^{(2)} + \Theta_{13}^{(2)}a_3^{(2)})$$

110 — Receive sequence of video frames

120 — Generate warp operation for first frame and reference frame

130 — Identify regions of interest of first frame

140 — Encode image data of regions of interest

150 — Determine quality score for first frame

160 — Transmit feature representation

170 — Encode image data of first frame

180 — Send encoded image data of first frame

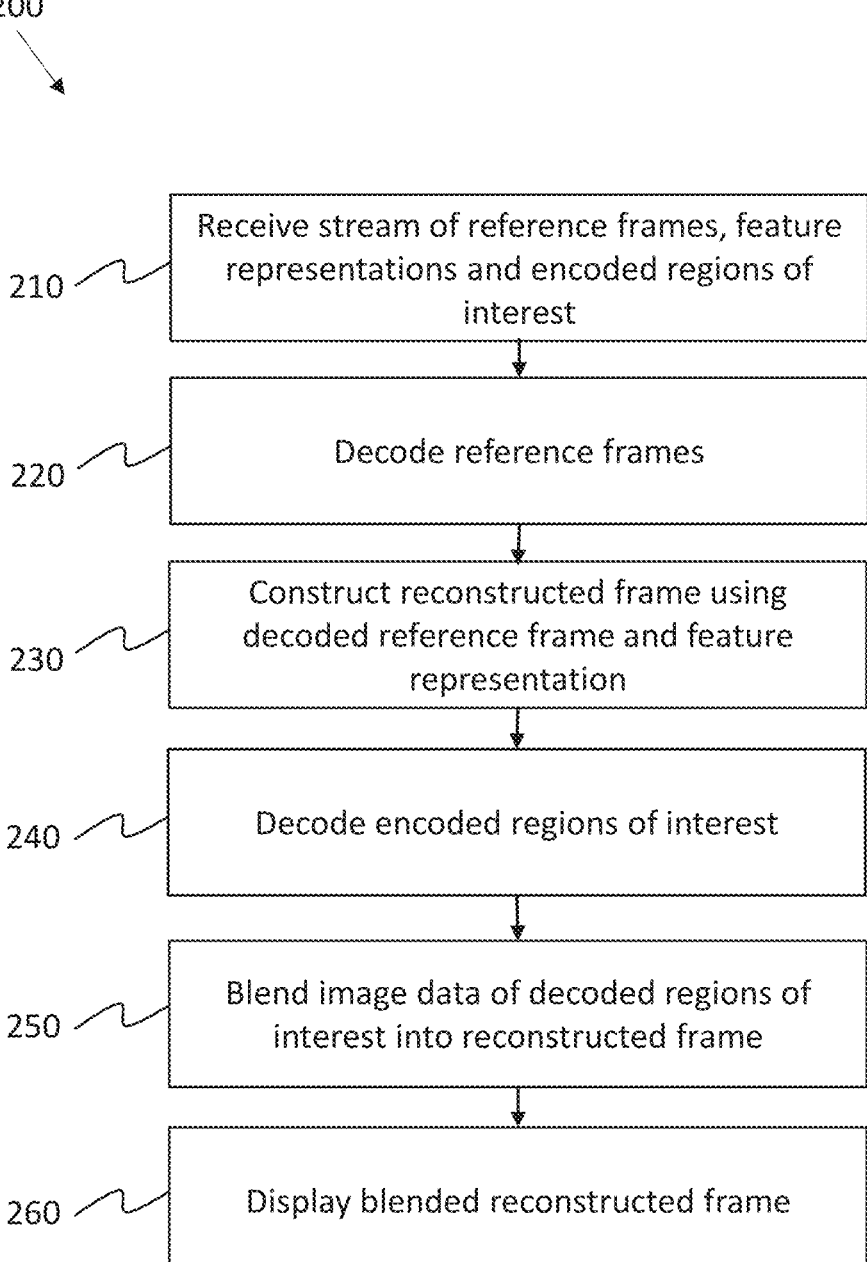

200

210 — Receive stream of reference frames, feature representations and encoded regions of interest 220 — Decode reference frames 230 — Construct reconstructed frame using decoded reference frame and feature representation 240 — Decode encoded regions of interest 250 — Blend image data of decoded regions of interest into reconstructed frame 260 — Display blended reconstructed frame

*FIG. 11*

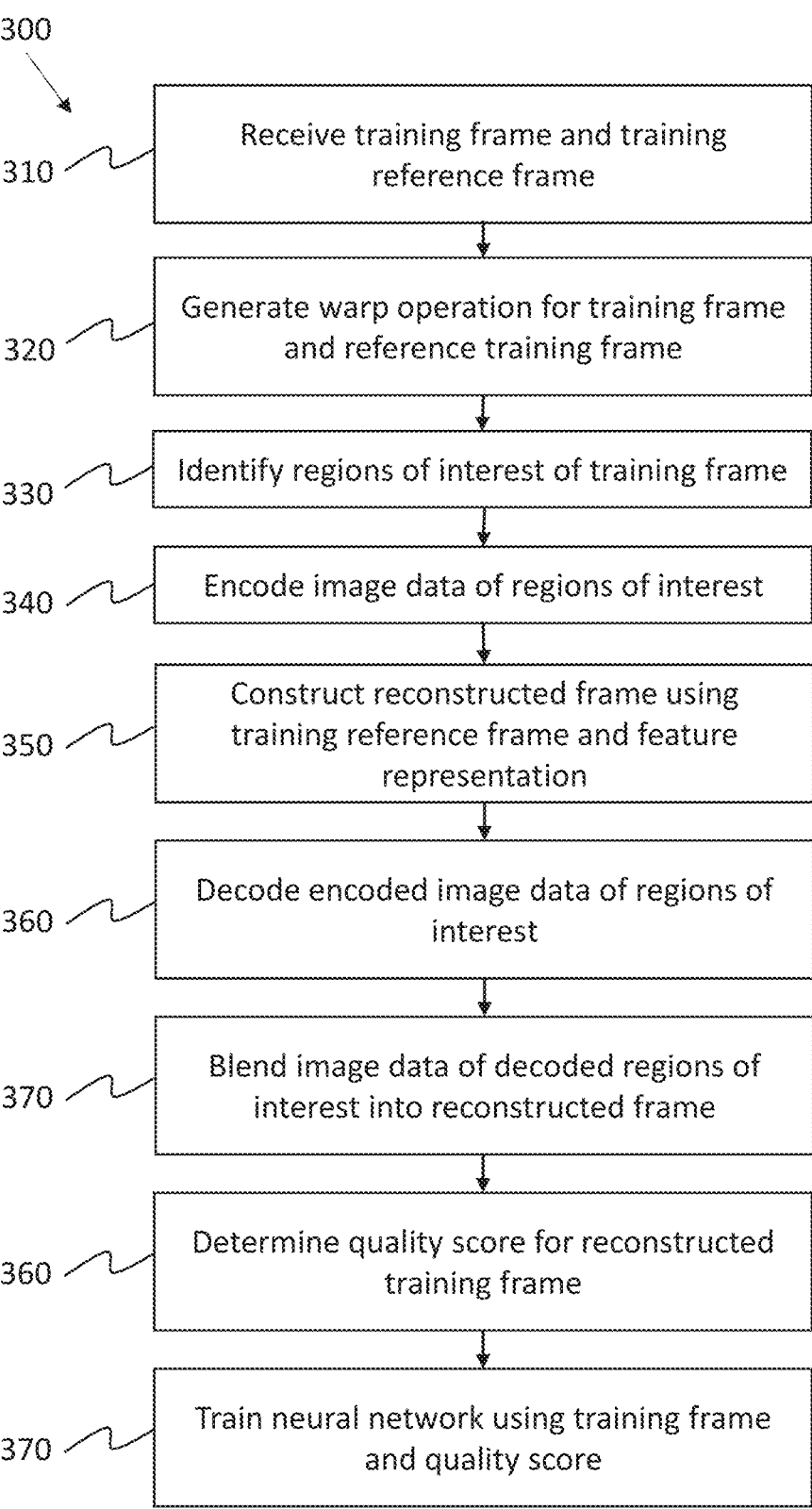

300

310 — Receive training frame and training reference frame

320 — Generate warp operation for training frame and reference training frame

330 — Identify regions of interest of training frame

340 — Encode image data of regions of interest

350 — Construct reconstructed frame using training reference frame and feature representation 360 — Decode encoded image data of regions of interest 370 — Blend image data of decoded regions of interest into reconstructed frame 360 — Determine quality score for reconstructed training frame 370 — Train neural network using training frame and quality score

410 — Receive stream of reference frames and feature representations

420 — Decode reference frames

430 — Generate adapted frame from reference frame

440 — Construct reconstructed frame using adapted frame and feature representation 450 — Display reconstructed frame

TRANSMITTING IMAGE DATA

CROSS-REFERENCE TO RELATED APPLICATIONS

This application claims the benefit of and priority to Greek Patent Application No. 20230100115, filed on Feb. 14, 2023, the entire contents of which are hereby incorporated by reference.

BACKGROUND

Field

The present disclosure concerns computer-implemented methods of transmitting video data. The disclosure also concerns computer-implemented methods of configuring artificial neural networks, computer-implemented methods of receiving video data, computing devices, and computer program products.

Description of Related Art

It is well known to use temporal prediction in images and video, such as video frame adaptive motion estimation or motion-compensated temporal filtering or motion-adaptive temporal warping, to predict a video stream at a current time instant based on the future or past of the video stream. For example, it is known to predict a current video frame based on past or future frames that have already been delivered to a receiver/decoder, and to encode and transmit only the residual error of the prediction. Recent video coding standards such as AV1 and VVC include motion warping or warp operations for motion-compensated temporal prediction. More recently, deep neural network architectures have been used in image/video prediction.

In known systems, prediction methods are either carried out in the signal domain or in some transform domain or in a compact latent representation. Importantly, the use of warp operations, whether learnable using a neural network or not learnable, is done within the encoding and temporal prediction framework as part of the prediction tools offered by a specific video encoder, e.g. an encoder implementing the VVC encoding standard. Alternatively, warp operations can allow for the creation of residual information that is then encoded with an external encoder, either in layers or as a single stream.

Such warp operations can provide very compact representation of video data. However, when using a warp operation to reconstruct a video frame, the accuracy of reconstructed video frame will depend on the properties of the video frame and surrounding video stream. This can lead to unwanted loss of quality where warp operations are used. In addition, where the video is of a human face, such in conversational video, videoconferencing and the like, small distortions caused by the warp operation in the areas of the eyes and mouth can produce an unwanted "uncanny valley" effect that is particularly noticeable to a viewer. Such small distortions can be difficult to detect algorithmically.

The present disclosure seeks to solve or mitigate some or all of these above-mentioned problems. Alternatively and/or additionally, aspects of the present disclosure seek to provide improved methods of processing image data.

SUMMARY

In accordance with a first aspect of the present disclosure there is provided a computer-implemented method of transmitting video data, the method comprising the steps of: receiving a sequence of video frames; determining a warp operation for a first frame and a reference frame of the sequence of video frames, wherein the warp operation defines a transformation of the reference frame to give an approximation of the first frame; identifying one or more regions of interest of the first frame; generating encoded image data from the image data of the one of more regions of interest of the first frame using an image encoder; and transmitting the warp operation and the encoded image data.

By transmitting a warp operation instead of an encoding of the entire video frame, less data is required allowing a lower bitrate. However, as discussed above, a disadvantage of warp operations is that for certain regions of interest in images, such as regions containing human eyes and mouths, an unwanted distortion effect can be produced, such as an "uncanny valley" effect. By identifying such regions of interest and sending encoded image data for those regions, the encoded image data can be used to replace the regions in which the unwanted distortion effect has occurred, so providing a more pleasing image for a viewer. However, as only the encoded image data for the regions of interest is transmitted, less data is required than if the entire video frame was encoded.

Further, by identifying regions of interest to be encoded (for example identifying eyes and/or mouths in an image), rather than attempting to identify distortions, unwanted distortions can be replaced without it being necessary to be able to identify those distortions algorithmically, which may be very difficult or impossible where those distortions are very small, for example distortions leading to "uncanny valley" effects.

In addition, for applications such as conversational video or presentation of an avatar in virtual reality, high correspondence to the original image may be not required. As a consequence, very compact warp operations can be used, as the resulting differences to the original image do not matter. Such very compact warp operations could however have a very significant unwanted effect in regions of interest containing human eyes and mouths, for example. The use of encoded image data for such regions of interest avoids this.

The warp operation may be generated by a feature encoder. As the encoding of image data is done externally to the feature encoder (i.e. the image encoder is external, or separate, to the feature encoder that determines the warp operation), the feature encoder does not need any access to the internal operations of the image encoder. The image encoder may be a video encoder. The video encoder may be any external image or video encoder, such as a conventional image encoder, for example using a JPEG, MPEG or AOMedia image or video encoding standard, or a proprietary image or video encoder. The video encoder can be used as a third-party "black box" encoder, with no access to its internal software or hardware being required.

In embodiments, the method further comprises the steps of: receiving the transmitted warp operation and encoded image data; generating the approximation of the first frame from the reference frame and the warp operation; generating decoded image data by decoding the encoded image data for the one or more regions of interest of the first frame using an image decoder; and generating a reconstructed frame by replacing the image data of the one or more regions of interest in the approximation of the first frame with the decoded image data for the one of more regions of interest.

In embodiments, the reconstructed frame is generated by blending the decoded image data for the one or more regions of interest in the approximation of the first frame using a blending operation.

In embodiments, the approximation of the first frame is generated from the reference frame and the warp operation by applying the warp operation to an adapted frame generated from the reference frame. The adapted frame may be generated from the reference frame by replacing one or more portions of image data within the reference frame. This provides a very efficient method by which elements in the original video can be made to be appear differently in the video produced by the reconstructed frames. For example, suppose the original video shows a person wearing a yellow T-shirt. By replacing the yellow T-shirt with a black T-shirt in the reference frame, the person will appear to be wearing a black T-shirt in all of the frames generated using the adapted reference frame. Such adaptation of a reference frame can be particularly effective where the video data is three-dimensional data, for example for use in a virtual reality environment. It may be that the entirety of an image of a person is replaced with an avatar in a reference frame, to give the adapted reference frame.

In embodiments, the encoded image data for the one of more regions of interest of the first frame is generated by: generating a filtered frame by replacing the regions of the first frame outside the one or more regions of interest with default image data; and encoding the image data for the filtered frame. For example, all of the image other than the regions of interest could be replaced with black color. Such default image data is encoded extremely efficiently by even conventional image encoders, so this provides an efficient way of transmitting the encoded image data for the regions of interest, as well as their locations in the original frame. In alternative embodiments the regions of interest may be encoded separately, for example.

In embodiments, default image data comprises the use of a mask that replaces the image data with constant-luminance values, or a mask comprising the weighted combination of values of one or more of the previous frames, or replacing the data with metadata for the coordinates of the region of interest masks. In general, default image data is interpreted as auxiliary data for the region of interest masks that incurs minimal rate overhead for the external video encoder to encode.

In embodiments, the method further comprises the steps of: determining a warp operation for a second frame and a second reference frame of the sequence of video frames, wherein the warp operation defines a transformation of the second reference frame to give an approximation of the second frame; identifying one or more regions of interest of the second frame; generating encoded image data from the image data of the one of more regions of interest of the second frame using an image encoder; generating the approximation of the second frame from the second reference frame and the warp operation for the second frame; generating decoded image data by decoding the encoded image data for the one of more regions of interest of the second frame using an image decoder; generating a reconstructed second frame by replacing the image data of the one or more regions of interest in the approximation of the second frame with the decoded image data for the one or more regions of interest; determining a quality score for the reconstructed second frame; in the case that the quality score is below a predetermined threshold, generating encoded image data for the second frame from the image data of the entirety of the second frame using an image encoder; and transmitting the encoded image data for the second frame.

In this way, it may be determined that even the reconstructed second frame using the encoded image data for the regions of interest will not be of sufficient quality, and so the entirety of the second frame can be encoded using an image encoder and transmitted instead, and subsequently decoded to provide the second frame. When the quality score is not below the predetermined threshold, the warp operation and encoded image data for the regions of interest can be transmitted as usual. When encoded image data for the entirety of the second frame is transmitted the warp operation and encoded image data for the regions of interest may not be transmitted, as they are not required. The second reference frame may be the first reference frame. The image encoder used to encode the entirety of the second frame may be the same as the image encoder used to encode the regions of interest, or may be a different image encoder.

The quality score may be indicative of the similarly between the second frame and the reconstructed second frame. The quality score may be a binary true or false result, a number on a range, or any other suitable result.

In alternative embodiments, the method may further comprise the steps of: determining, using an artificial neural network, a reconstruction quality score for a second frame and a second reference frame of the sequence of video frames; in the case that the reconstruction quality score is below a predetermined threshold, generating encoded image data for the second frame from the image data of the entirety of the second frame using an image encoder; and transmitting the encoded image data for the second frame; wherein the artificial neural network has been trained using pairs of training frames and training reference frames by, for each training frame and training reference frame of a pair of training frames and training reference frames determining a warp operation for the training frame and the training reference frame, wherein the warp operation defines a transformation of the training reference frame to give an approximation the training frame; identifying one or more regions of interest of the training frame; generating encoded image data from the image data of the one of more regions of interest of the training frame using an image encoder; generating the approximation of the training frame from the training reference frame and the warp operation for the training frame; generating decoded image data by decoding the encoded image data for the one of more regions of interest of the training frame using an image decoder; generating the reconstructed training frame by replacing the image data of the one or more regions of interest in the approximation of the training frame with the decoded image data for the one of more regions of interest of the training frame; determining a quality score for the reconstructed second frame; and training the artificial neural network using the training frame and the quality score.

In this way, the reconstructed second frame does not need to be generated at the time the quality score is required in order to allow the quality score to be determined, but instead it can be generated by a pre-trained neural network. Thus, the neural network is used to decide whether the warp operation and encoded regions of interest will be sufficient, or if an educing of the entirety of the image should to be transmitted.

The training reference frame may also be used to train the artificial neural network.

In embodiments, the neural network is trained using a loss function configured to determine a difference between an output of the neural network and the output of the alignment pipeline. Training the neural network may comprise adjusting the weights of the neural network to try to minimize the loss function, such that the output of the neural network is similar to the output of the alignment pipeline. The neural network may be trained using back-propagation of errors and stochastic gradient descent, for example, where the errors are generated using the loss function (and consequently the alignment pipeline).

In embodiments, the neural network comprises a convolutional neural network (CNN). Such a neural network comprises multiple layers having a convolutional architecture, with each layer being configured to receive the output of one or more previous layers. Such an artificial neural network may comprise a set of interconnected adjustable weights and activation functions. In embodiments, the outputs of each layer of the neural network are passed through a non-linear parametric linear rectifier function, pReLU. Other non-linear functions may be used in other embodiments.

In accordance with a second aspect of the present disclosure there is provided a computer-implemented method of transmitting video data, the method comprising the steps of: receiving a sequence of video frames; determining a warp operation for a first frame and a reference frame of the sequence of video frames, wherein the warp operation defines a transformation of the reference frame to give an approximation of the first frame; determining a quality score for the approximation of the first frame; in the case that the quality score is above a predetermined threshold, transmitting the warp operation; in the case that the quality score is below the predetermined threshold, generating encoded image data for the first frame from the image data of the first frame using an image encoder, and transmitting the encoded image data.

In this way, a warp operation can be sent if it is determined that it will provide a resulting frame of sufficient quality, but it is determined it will not, an encoding of the frame can be sent instead. This allows the very compact representation of video data provided by a warp operation to be used where it is suitable to do so, but a conventional image encoding to be used where the warp operation would not give a result of sufficient quality.

In embodiments, the quality score is indicative of the similarly between the first frame and the approximation of the first frame.

In embodiments, the determining of the quality score comprises: generating the approximation of the first frame from the reference frame and the warp operation; and determining the quality score from the generated approximation of the first frame.

In alternative embodiments, the determining of the quality score comprises: determining, using an artificial neural network, the quality score from the first frame and the reference frame; wherein the artificial neural network has been trained using pairs of training frames and training reference frames by, for each training frame and training reference frame of a pair of training frames and training reference frames: determining a warp operation for the training frame and the training reference frame, wherein the warp operation defines a transformation of the training reference frame to give an approximation the training frame; generating the approximation of the training frame from the training reference frame and the warp operation for the training frame; determining a quality score for the approximation of the training frame; and training the artificial neural network using the training frame and the quality score.

In embodiments, the predetermined threshold for the quality score is determined using the bitrate of the transmitted image data. This allows the more compact warp operation to be used more frequently if the bitrate is too high, for example. In alternative embodiments, a percentage of regions of interest or frames being encoded using the image encoder may be used, or mean opinion score results from human evaluations may be used, to give just some examples.

In embodiments, the images of the sequence of video frames are two-dimensional images. The video may be used in conversation video and videoconferencing applications, for example.

In alternative embodiments, the images of the sequence of video frames are three-dimensional images. The video may be used in virtual reality applications, for example.

In accordance with a third aspect of the present disclosure there is provided a computer-implemented method of configuring an artificial neural network to determine a reconstruction quality score, the method comprising the steps of: receiving a training frame and a training reference frame; determining a warp operation for the training frame and the training reference frame, wherein the warp operation defines a transformation of the training reference frame to give an approximation the training frame; generating the approximation of the training frame from the training reference frame and the warp operation for the training frame; generating a reconstructed training frame from the approximation of the training frame; determining a quality score for the reconstructed training frame; and training the artificial neural network using the training frame and the quality score.

In embodiments, the reconstructed training frame is the approximation of the training frame.

In alternative embodiments, the method further comprises the steps of: identifying one or more regions of interest of the training frame; generating encoded image data from the image data of the one of more regions of interest of the training frame using an image encoder; generating decoded image data by decoding the encoded image data for the one of more regions of interest of the training frame using an image decoder; and generating the reconstructed training frame by replacing the image data of the one or more regions of interest in the approximation of the training frame with the decoded image data for the one or more regions of interest of the training frame.

In accordance with a fourth aspect of the present disclosure there is provided a computer-implemented method of receiving video data, the method comprising the steps of: receiving a reference frame; receiving a warp operation for a first frame and the reference frame, wherein the warp operation defines a transformation of the reference frame to give an approximation the first frame; receiving encoded image data for one or more regions of interest of the first frame; generating an approximation of the first frame from the reference frame and the warp operation; generating decoded image data by decoding the encoded image data for the one of more regions of interest of the first frame using an image decoder; and generating a reconstructed frame by replacing the image data of the one or more regions of interest in the approximation of the first frame with the decoded image data for the one of more regions of interest.

In embodiments, the approximation of the first frame is generated from the reference frame and the warp operation by applying the warp operation to an adapted frame generated from the reference frame. In embodiments, the adapted frame is generated from the reference frame by replacing one or more portions of image data within the reference frame.

In accordance with a fifth aspect of the present disclosure there is provided a computer-implemented method of receiving video data, the method comprising the steps of: receiving a reference frame; receiving a warp operation for a first frame and the reference frame, wherein the warp operation defines a transformation of the reference frame to give an approximation the first frame; generating an adapted frame from the reference frame; generating an approximation of the first frame from the adapted frame and the warp operation; and generating a reconstructed frame from the approximation of the first frame.

In embodiments, the reconstructed frame is the approximation of the first frame. In embodiments, the adapted frame is generated from the reference frame by replacing one or more portions of image data within the reference frame.

In accordance with a sixth aspect of the present disclosure there is provided a computing device comprising: a processor; and a memory, wherein the computing device is arranged to perform, using the processor, a method as described above.

In accordance with a seventh aspect of the present disclosure there is provided a computer program product arranged, when executed on a computing device comprising a processor and memory, to perform a method as described above.

It will of course be appreciated that features described in relation to one aspect of the present disclosure described above may be incorporated into other aspects of the present disclosure.

DESCRIPTION OF THE DRAWINGS

Embodiments of the present disclosure will now be described by way of example only with reference to the accompanying schematic drawings of which:

FIG. 11 is a flowchart showing the steps of a method of receiving image data in accordance with embodiments;

FIG. 12 is a flowchart showing the steps of a method of configuring an artificial neural network in accordance with embodiments;

DETAILED DESCRIPTION

Figure 1:
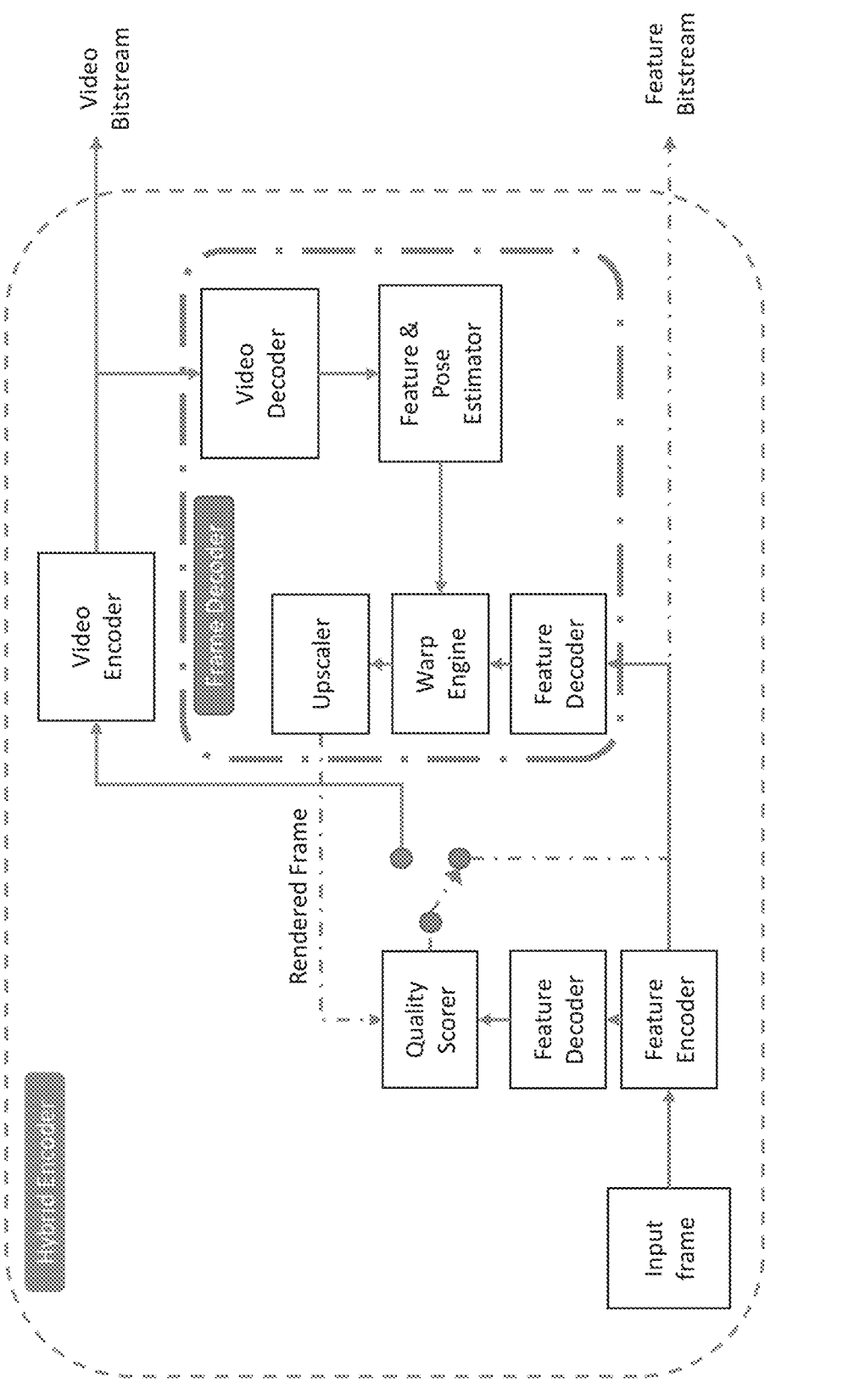
FIG. 1 is a schematic workflow diagram showing an example hybrid encoder in accordance with embodiments of the invention.

FIG. 1 is a schematic diagram showing an example of a hybrid encoder. The hybrid encoder shown in FIG. 1 is operable to take as input a stream of frames of video data, and process them for transmission as a bitstream. In particular, the hybrid encoder does this using a hybrid encoding method that uses both a feature encoder that generates a compact encoding of a frame, and a conventional video encoder that generates a conventional, less compact encoding of a frame. The system also uses a frame decoder, which simulates the result of decoding the bitstream output by the hybrid encoder, which it uses to decide how to encode input video frames, as described in detail below.

The hybrid encoder of FIG. 1 receives the current video frame of the stream of frames of video data as input frame, and passes it the feature encoder. Similar to known feature encoders, the feature encoder generates a compact feature representation of the frame using a reference frame, i.e. another frame from the stream, from which, using the feature representation, an approximation of the input frame can be generated. Where a reference frame is available, this is used by the feature encoder to generate a feature representation for the frame. The operation of the feature encoder and the feature representation are described in detail below. The feature representation is passed to a frame decoder, and in particular to the feature decoder of the frame decoder. The frame decoder is again described in detail below.

If no reference frames are available, for example because of an encoding refresh, or because the input frame is the very first frame, the feature representation generated by the feature encoder is decoded by a feature decoder in order to reconstruct the input frame. The reconstructed input frame is passed to a quality scorer, but, since there is no alternative decoded frame with which to compare the reconstructed input frame to give a score, the quality scorer simply passes it to a conventional video encoder. The reconstructed input frame is then encoded as an intra frame (i.e. a frame that is independent of previous or subsequent frames) using the conventional video encoder, and is transmitted as a video bitstream as the output of the hybrid encoder.

As well as being transmitted as output, the encoded frame is also passed to the frame decoder. The frame decoder decodes the encoded frame using a conventional video decoder. All decoded frames are made available as reference frames, and one or more of them can be used for subsequent encoding steps. Similar to conventional encoding, it is typical that only a small number of decoded frames are used as reference frames, for example the most recently decoded frame, or the last K decoded frames, with K≤10 in typical scenarios. All reference frames are passed through a feature and pose estimator to produce features, which are passed to a warp engine, which outputs a warped frame. The feature and pose estimator and the warp engine are described in detail below. If no new input is passed to the warp engine by the feature decoder of the frame decoder, as is the case for the very first frame, then the reference frame is warped with itself (with zero input from the feature decoder) to produce a warped frame, which is in turn passed to an upscaler to produce a reconstructed frame. The reconstructed frame is the output of the decoder, and is passed to the quality scorer.

When the next input frame is processed, as there are reference frames available, as mentioned above the feature representation of the input frame generated by the feature encoder is passed to the feature decoder of the frame decoder. The feature decoder produces output features that comprise the feature bitstream that is sent to the decoder. This feature bitstream is decoded in the warp engine, which as above outputs a warped frame which is passed to an upscaler to produce a reconstructed frame. The reconstructed frame is again passed to the quality scorer as the output of the decoder. Importantly, reconstructed frame represents a reconstruction of the current frame as would (or could) be produced by an external decoder having access to the reference frames and the feature bitstream.

The reconstructed frame is used by the quality scorer to determine a quality score for the reconstructed frame. The operation of the quality scorer is described in more detail below. If the quality score for the reconstructed frame is above a predetermined threshold, it can be considered that the feature representation generated by the feature encoder can be used by an external decoder to reconstruct a frame of sufficient quality. In this case, the feature representation is transmitted as a feature bitstream as the output of the hybrid encoder.

However, if the quality score for the reconstructed frame is below the predetermined threshold, it can be considered that the feature representation generated by the feature encoder is not usable by an external decoder to reconstruct a frame of sufficient quality. In this case, the quality scorer passes original input frame to the conventional video encoder, which again encodes as an intra frame, and it is transmitted as a video bitstream as the output of the hybrid encoder.

In this way, the hybrid decoder is able to output the compact feature representation generated by the feature encoder when it is determined by the quality scorer that it can be used to generate a reconstructed frame of sufficient quality, but can output an intra frame generated by a conventional image encoder when it is determined that the quality provided by the compact feature representation would not be sufficiently high. This allows the hybrid encoder to provide use of data while avoiding unwanted dips in quality.

Figure 2:
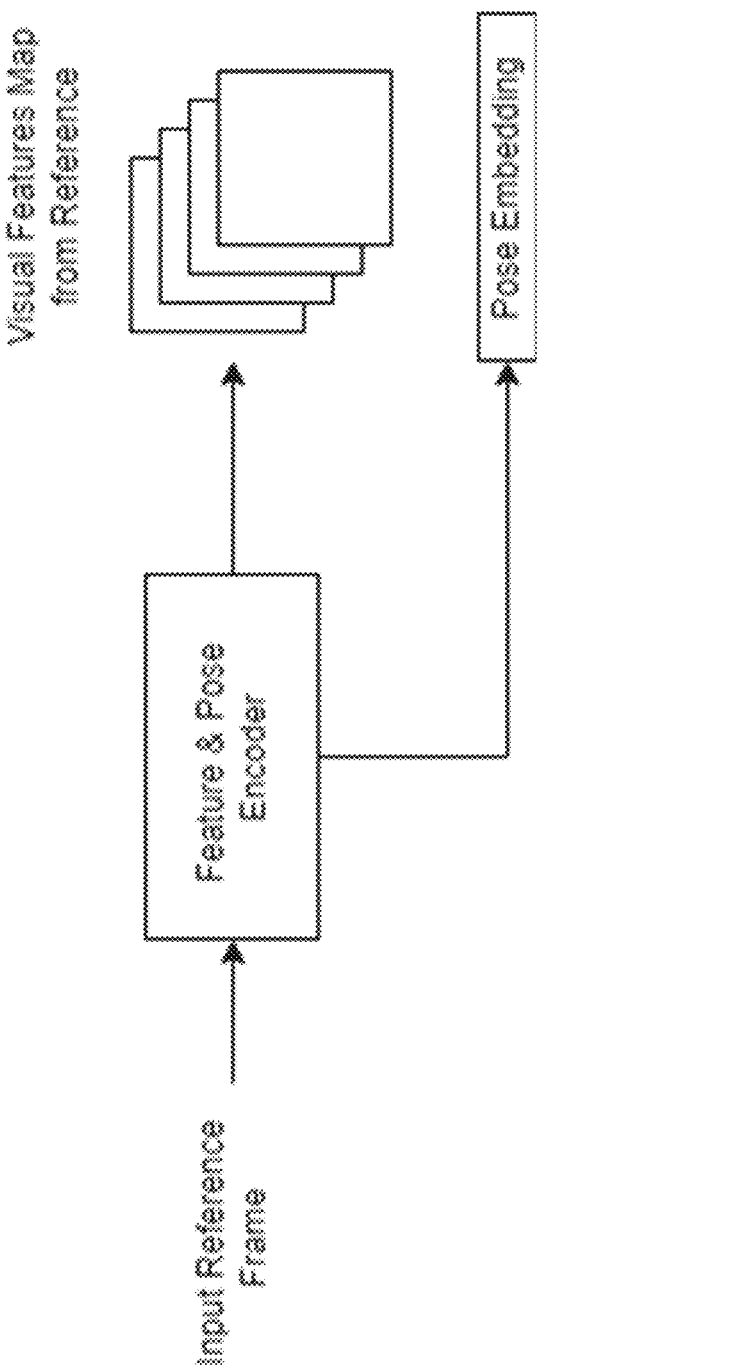
FIG. 2 is a schematic diagram showing a feature and pose estimator of FIG. 1 in accordance with embodiments.

FIG. 2 is a schematic diagram of the feature and pose estimator of the hybrid encoder. The feature and pose estimator receives decoded frames from the conventional video decoder, and generates an encoding of visual features and a latent pose embedding for the decoded frames, which can then be used as a reference frame by the warp engine.

Figure 7:
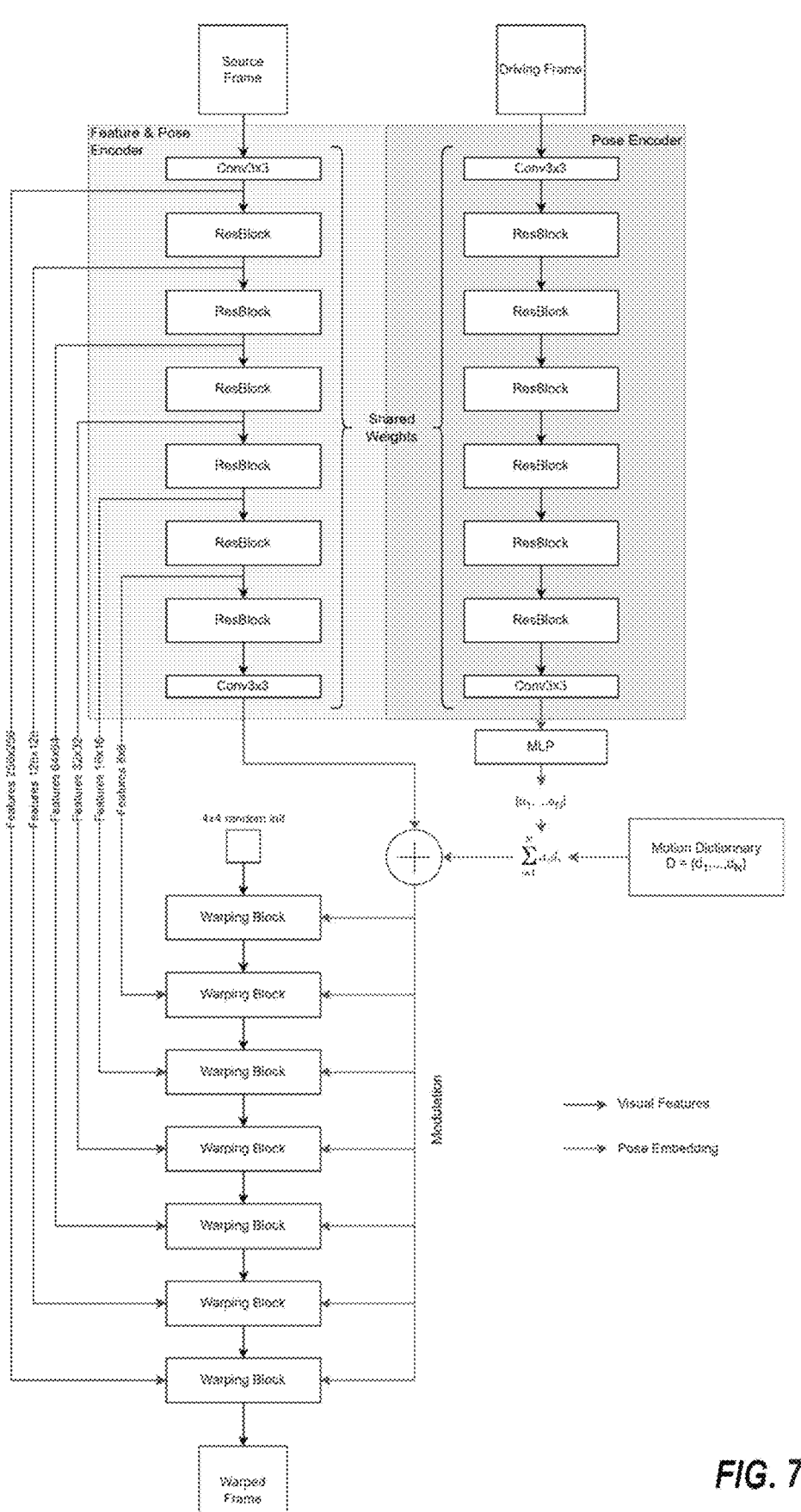
FIG. 7 is a schematic diagram of architecture of neural network components used during training of an artificial neural network in accordance with embodiments.

In the present embodiment, the feature and pose estimator and the warp engine are neural networks organized into an auto-encoder layout. Thus, the encoding of the visual features and the latent pose embedding can be done using a convolutional neural network (CNN). In particular, as in the present embodiment the warping process is designed to work at different scales, feature maps computed at different resolutions are required. A backend combining convolution layers and downsampling, such as ResNet or MobileNet for example, provides the required multi-scale visual features. Using a training process for the CNN that is focused on disentanglement, the latent pose embedding generated by the feature and pose encoder can be specific to the pose, allowing the encoding of both the visual features and the latent pose embedding using a single neural network as shown in FIG. 7, and described in more detail below.

Figure 3:
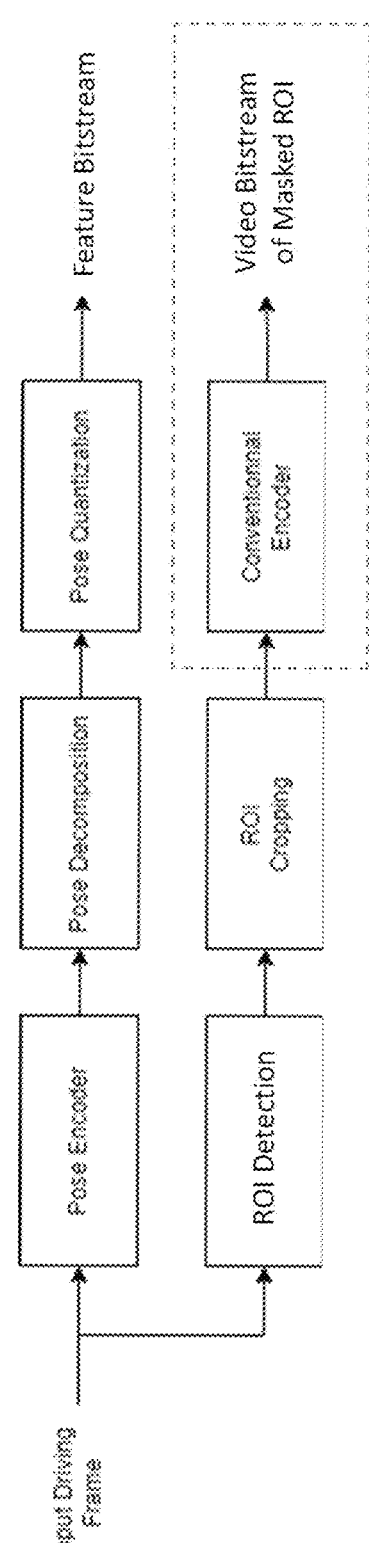
FIG. 3 is a schematic diagram showing a feature encoder of FIG. 1 in accordance with embodiments.

FIG. 3 is a schematic diagram of the feature encoder of the hybrid encoder. As shown in the top branch of FIG. 3, when provided with an input driving frame, the feature encoder outputs a primary feature bitstream. The primary feature bitstream is represents the pose, or "motion", of the driving frame. The idea is that to reconstruct the driving frame, as the warp engine already has access to the visual features and the pose of the reference frame, the warp engine requires only the target pose contained in the driving image. Thus, the feature representation can be considered to be a warp operation, providing information about how the reference frame should be warped in order to reconstruct (an approximation of) the driving frame.

In order to do this, the driving frame is encoded. In the present embodiment, a neural network is used that shares its weights with the feature and pose estimator, but only considers the final pose vector. This vector, which may for example be of 512 dimensions and in floating-point representation, is then compacted into a small number of coefficients, for example 200 in floating point representation, with the combination of these coefficients representing the weight for a weighted sum of known vectors. Suppose $D=\{d_i\}_{i\in[1,N]}$ is defined to be a dictionary of N learned vectors in the pose embedding space, with N=200 in the example instantiation, and D required to be an orthonormal family. The pose decomposition returns the coefficients $\alpha_i$ such that a vector in the pose embedding space can be retrieved by computing the sum:

$$\sum_{i=1}^{N} \alpha_i d_i.$$

Those coefficients are then further compressed into lower dimension using an auto-encoder or a PCA for instance, and quantized (e.g. clustering). In this way, the final motion code sent to the quantized bitstream is as small as possible (e.g. 50 coefficients uint8).

In certain embodiments, the output of the warping module can be evaluated using a quality metric and so that warped frames of unsatisfactory quality can be filtered out. This allows bad frames with global distortions to be identified, as typically arise in hard cases, for example warping from side view to front view in a conversational video.

However, more subtle local distortions in certain regions are not always detected, which are nevertheless particularly noticeable to a human viewer. This includes distortions that result in "uncanny valley" effects, caused by small distortions in regions including the eyes and mouth of a person, for example. As shown in the bottom branch of FIG. 3, in order to avoid this, regions of interest (ROI) in the warped frames can be identified. These regions of interest can include, for example, human eyes and mouths, which can be detected using known face detection algorithms, for example. Since the original frame is available, the regions of interest can be cropped from the frame, for example by replacing the image data of the frame other than the regions of interest with blank color. The cropped regions of interest are then encoded using a conventional video encoder, which may be the conventional video encoder used by the frame decoder to generate intra frames, or another video encoder, to produce a video bitstream of masked regions of interest, which is sent along with the primary feature bitstream as the feature representation output by the feature encoder. While the output feature representation comprises both a feature bitstream and a video bitstream, the video bitstream is only of the regions of interest rather than a whole frame, and so the video bitstream together with the feature bitstream are much more compact than a conventional encoded video bitstream.

When a frame is reconstructed using the feature representation, the image data of the regions of interest provided by the video bitstream can be blended into the image reconstructed using the feature bitstream, to eliminate unwanted distortions.

Figure 4:
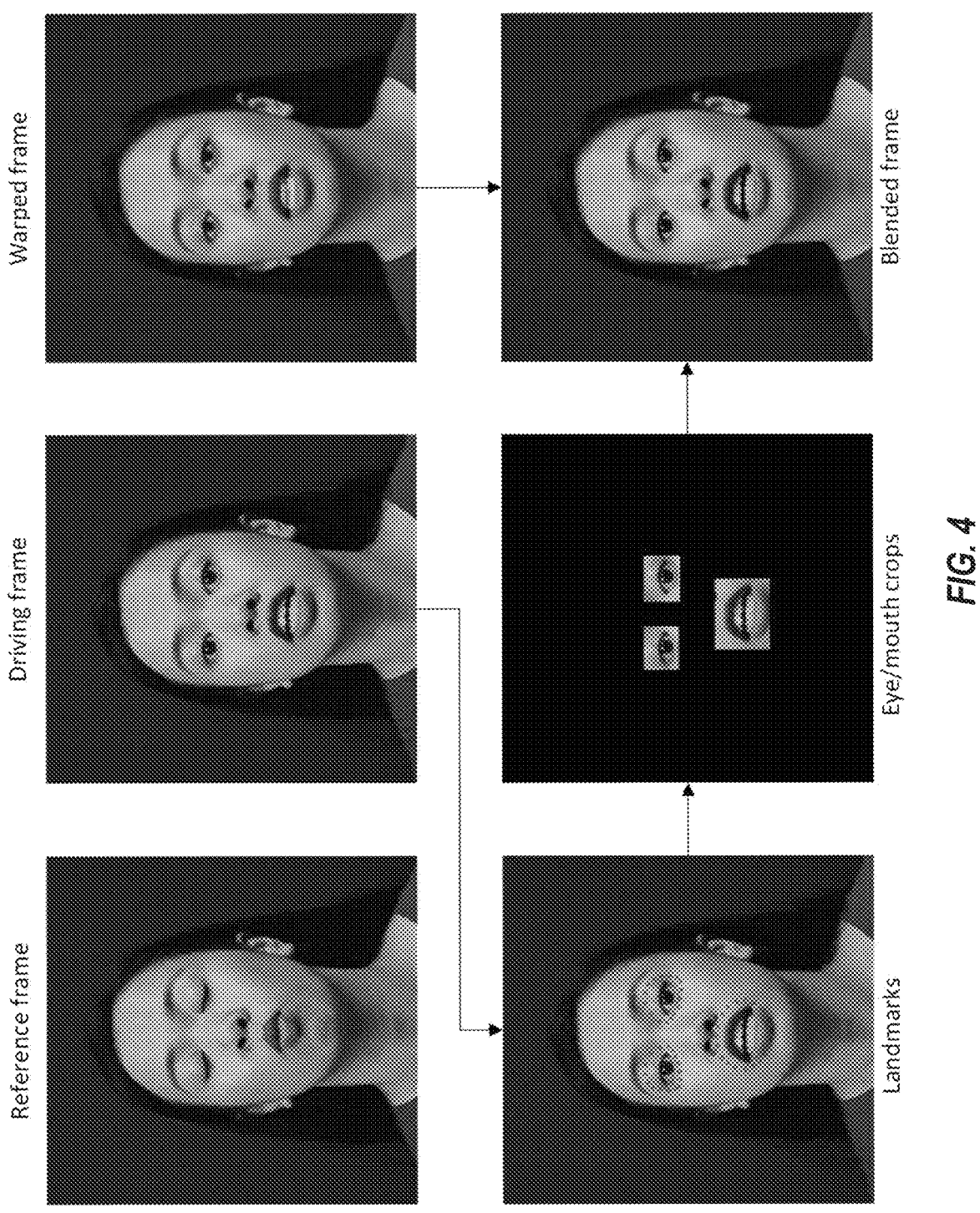
FIG. 4 shows example video frames in accordance with embodiments.

An example in the case of conversational video is shown in FIG. 4. A reference frame and a driving frame are shown. A facial landmark detection method is used to determine the coordinates of the bounding boxes of the eye/mouth crops. For this example, the MediaPipe Face Mesh may be used, which estimates 468 landmarks to allow it to accurately locate the crops by bounding the areas between the extremities of the landmarks horizontally and vertically and allowing for a certain extra frame space to ensure the entirety of the region is captured (e.g. 20% additional frame area to the area of the extremities of the detected landmarks). The example of Face Mesh incorporates a BlazeFace face detector (a known face detector algorithm), face landmarks model, and attention mesh model for more accurate landmarks prediction. The outer left and right eye landmarks are used to extracting eye crops and upper/lower lip landmarks for the mouth crop. Other examples of region of interest detection are based on eye/mouth crop loss, gaze loss, face expression loss in conversational video, or object detection and region-of-interest-based quality losses for different detected objects. For all these losses, candidate region of interest regions of the input frames and the corresponding regions of the output of the warp engine can be scored in order to determine if they should be included as regions of interest, using predetermined thresholds.

When reconstructing the input frame, blending of the crops with the warped frame from the warp engine is performed using an image processing technique for image mosaicking or image blending. This allows inserting one image into another without introducing visible discontinuities. As can be seen from the blended image of FIG. 4, in the example of conversational video with detected and utilized regions of interest being the eyes and the mouth portions, extracted as discussed above, seamless blending around the regions of interest can be achieved, avoiding the "uncanny valley" effect caused by the distortions in the warped frame around the eyes and mouth.

Figure 5:
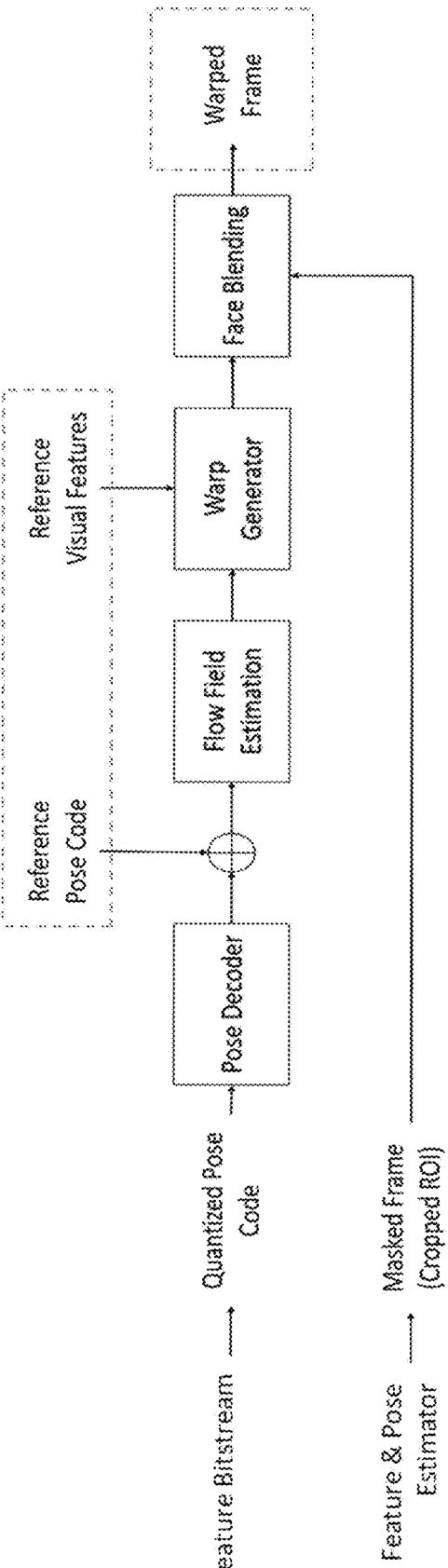
FIG. 5 is a schematic diagram showing a warp engine of FIG. 1 in accordance with embodiments.

FIG. 5 is a schematic diagram of the warp engine of the hybrid encoder. The warp engine receives the bitstream generated by the feature encoder, and the quantized pose code of the driving frame. In some embodiments, it can also receive the masked frame containing the regions of interest, as generated by the conventional video encoder and decoder. It also leverages the pose code and the visual features of the reference frame, obtained from the feature and post estimator.

In operation, first the encoded pose information for the driving frame is decoded into the same space as the pose information of the reference frame. In embodiments, the encoded pose information is compressed using a multi-layer perceptron (MLP) as the one of FIG. 8(b). It first goes through the feature decoder of the frame decoder to retrieve all the coefficients, and, using the weighted sum on the dictionary D as explained above, the actual pose embedding of the driving frame is obtained. The feature decoder is shown as "pose decoder" in FIG. 5, and is not in fact part of the warp encoder, but is included to facilitate the description of the warp encoder.

The retrieved pose embedding is then added to the pose information of the reference frame. The resulting vector is a latent representation of the motion required to go from the reference frame to the driving frame.

Figure 6:
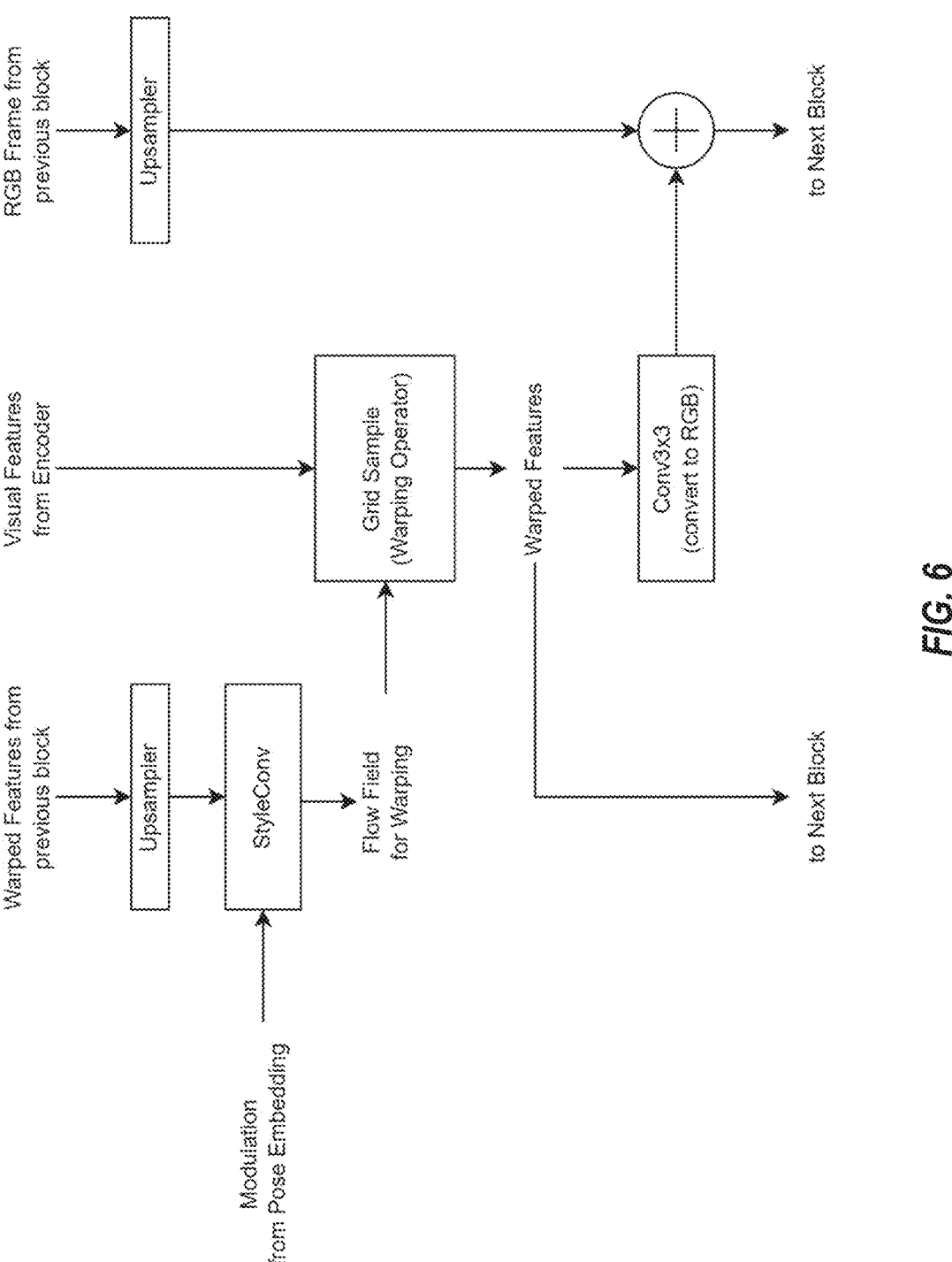
FIG. 6 is a schematic diagram showing a warp block of the warp engine of FIG. 5 in accordance with embodiments.

Next, the visual features of the reference frame are warped with the correct field in order to reproduce the driving frame. The flow field estimation and warp generator can in embodiments take the form of a StyleGan2 adapted to apply warping to the features. The StyleGan2 is a multi-scale approach with each level composed of its own warping block, an example of which is shown in FIG. 6.

In this example approach, warping blocks are built using 2D convolutional layers. The flow field estimation uses a style convolution modulated by the pose encoding to predict the flow field for warping. The warp operator is a grid sample function applying the predicted flow to the feature maps of the reference. A final convolution layer merges the warped feature maps into an RGB frame. Thus, each block provides a RGB warped frame at a different resolution. A final CNN for upsampling and merging all those frames provides the final output frame.

The regions of interest are then blended into the RGB warped frame, to produce the warped frame as discussed above, to produce the warped frame that is the output of the warp engine.

As discussed above, the feature and pose estimator and the warp engine can be provided using neural networks organized into an auto-encoder layout, as shown in FIG. 7. The model can be trained end-to-end in a self-supervised approach. In this example, as training data is required a large amount of video clips in which an individual is talking in front of a camera. Those clips are pre-processed using standard face landmarks detectors which allow them to be cropped according to a bounding box centered on the face of the speaker.

During training, pairs of frames are sampled from clips picked randomly. Those pairs are arranged in batches of tuples $(X_{ref}, X_{drive})$ and forwarded to the model. The end to end forward pass through the model is illustrated in FIG. 7.

Supposing $X_{recon}$ is the reconstructed image given an input $(X_{ref}, X_{drive})$, a single training loss composed of three components can be computed:

$$\text{Pixel loss: } L_{reconst}(X_{recon}, X_{drive}) = \|X_{recon} - X_{drive}\|_1$$

$$\text{Perceptual loss 1: } L_{VMAF}(X_{recon}, X_{drive}) = 1 - VMAF(X_{recon}, X_{drive})$$

$$\text{Perceptual loss 2: } L_{VGG}(X_{recon}, X_{drive}) = \|vgg(X_{recon}) - vgg(X_{drive})\|_1$$

The global loss minimized during training is then computed as it follows:

$$L = \lambda_{reconst} * L_{reconst} + \lambda_{VMAF} * L_{VMAF} + \lambda_{VGG} * L_{VGG}$$

The models learn to reconstruct the image $X_{drive}$ given the visual features of $X_{drive}$ and the motion information from both $X_{drive}$ and $X_{drive}$.

The $L_{VMAF}$ refers to a differentiable approximation of the VMAF score, and the $L_{VGG}$ is the L1 distance computed on the multi-scale features extracted from a pretrained VGG19, as will be understood by the skilled person.

The output of the warp engine can be a low-resolution image, such as a 256×256 image. In such cases, an upscaler can be used to upscale the image into a high-resolution representation, of which many will be known to the skilled person.

The quality scorer of the hybrid encoder is now described. The quality scorer gives a score for the reconstructed frame, i.e. the frame constructed from the reference frame and the feature representation of the input frame. Generally, the reconstructed frame is scored for its perceptual similarity to the input frame. This can for example be done using a structural similarity index metric or a video multimethod assessment fusion method, which compare the reconstructed frame with the input frame.

The predetermined threshold against which the score is compared can be dependent upon the bitrate output by the hybrid encoder, or the percentage of regions of interest or frames being encoded by the conventional video encoder, for example. This allows a quality score to be required where the amount of data in the bitstream output by the hybrid decoder is too large, reducing the amount of data output. Conversely, where more bandwidth is available, a higher quality score can be required.

In other embodiments, the score is determined from the input frame using a neural network, without the reconstructed frame actually being generated. In other words, the neural network estimates the quality score the reconstructed frame of an input frame would be given, using only the input frame. This can be done by pretraining a neural network on training data comprising pairs of input frames and quality scores, where the quality scores are determined by generating the reconstructed frame for the input frame, and using the reconstructed frame and the input frame to determine the quality score, for example using methods as discussed above.

Figure 8C:
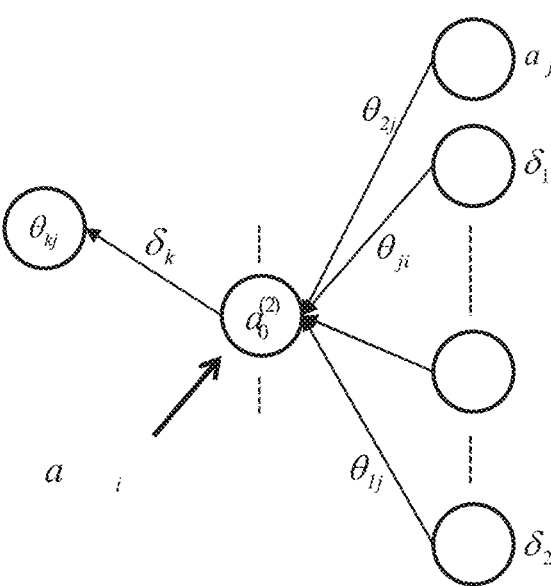
FIGS. 8(*a*) to 8(*c*) are schematic diagrams showing examples of neural networks in accordance with embodiments.

A neural network as described herein may comprise a network of inter-connected learnable weights. In particular, a neural network, such as a convolutional neural network (CNN), can comprise any combination of weights connected in a network and having a non-linear function (akin to an activation function of an artificial neural network). An example of such connections and weights is shown in FIG. 8(a). An example of the global connectivity between weights and inputs is shown in FIG. 8(b). That is, FIG. 8(a) shows a combination of inputs $x_0$, . . . , $x_3$ with weight coefficients $\Theta$ and non-linear activation function g( ), which can comprise a parametric ReLU (pReLU) function, or another non-linear function like ReLU or sigmoid or other function. FIG. 8(b) is a schematic diagram showing layers of interconnected activations and weights, forming an artificial neural network. Such examples are trained with back-propagation of errors computed at the output layer, using gradient descent methods. This is shown in FIG. 8(c), which depicts schematically the back-propagation of errors $\delta$ from coefficient $\alpha_0^{(2)}$ of an intermediate layer to the previous intermediate layer using gradient descent.

The illustrated errors are indicated by $\delta_1$, $\delta_2$, . . . , $\delta_k$, and they are computed from errors of subsequent layers, which, in turn, are computed eventually from errors between network outputs and training data outputs that are known a priori. Such a priori known outputs can comprise test video frames that are given as input training data and the network outputs comprise the inferred reconstructed frames from the decoding and reconstruction steps of the hybrid encoder. These errors between network outputs and training data are evaluated with a set of functions, termed "loss functions", which evaluate the network inference error during the training process using appropriate loss or cost functions to the problem at hand. As the training data is compared with the inferred reconstructed data, the process of training is can be termed as self-supervised training or auto-encoder training, for which no external "labels" or annotations or other external metadata are required for the training data.

Figure 9:
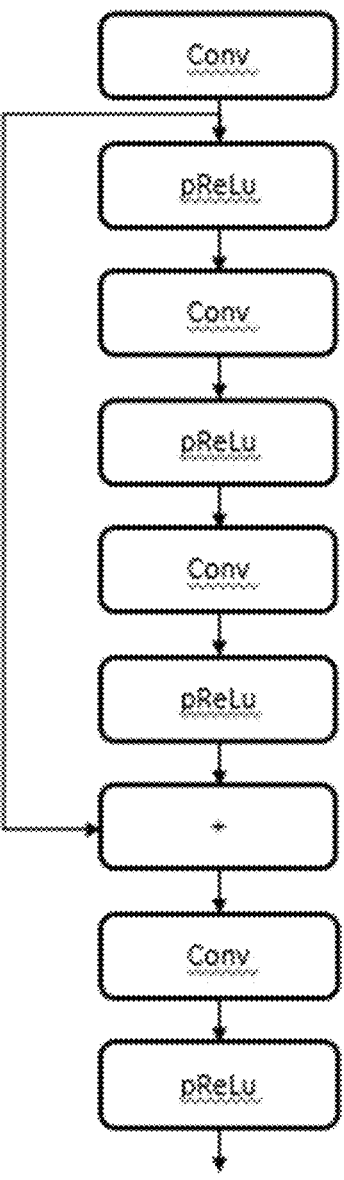
FIG. 9 is a schematic diagram showing layers of an example neural network in accordance with embodiments.

Examples of encoding of the input into a compact latent representation and generation of the reconstructed signal from a latent representation involve CNNs consisting of a stack of convolutional blocks (conv blocks), as shown in FIG. 9, and stacks of layers of fully-connected neural networks of the type shown in FIG. 7. In embodiments, the convolutional blocks can include dilated convolutions, strided convolutions, down/up-scaling operations (for compaction and expansion, respectively, also sometimes termed as convolution/deconvolution), normalization operations, and residual blocks. In certain embodiments, the CNN can include a multi-resolution analysis of the image using a U-net architecture. FIG. 9 shows a cascade of conditional convolutional and parametric ReLu (pReLu) layers mapping input pixel groups to transformed output pixel groups. All layers receive codec settings as input, along with the representation from the previous layer. There is also an optional skip connection between two intermediate layers. Some layers may also have dilated convolutions or pooling components to increase or decrease resolution of the receptive field, respectively.

The output of both CNNs can be either a 2D or 3D feature block (or reconstructed 2D image or 3D video frames, or feature layers composed of features from a graph convolution step), or a 1D vector of features. In the latter case, the last convolutional layer is vectorized either by reshaping to 1D or alternatively by using a global pooling approach (i.e., global average pooling or global max pooling). In such cases, the dimensionality of the vector is the number of channels in the last convolutional layer. If the output is 1D, the vectorization is typically followed by one or more dense layers, as shown in FIG. 8(b).

In embodiments, back-propagation learning uses learning rules that are deterministic or stochastic (e.g. done after averaging over batches of arbitrarily sampled inputs/outputs). Gradients can be computed on single inputs, on batches of inputs or on the whole training dataset, per training iteration. The learning parameters, such as the initial learning rate and learning rate decay, can be empirically tuned to optimize speed of training and performance. Batches of training data can be selected in a deterministic or random/pseudo-random manner.

Figure 10:
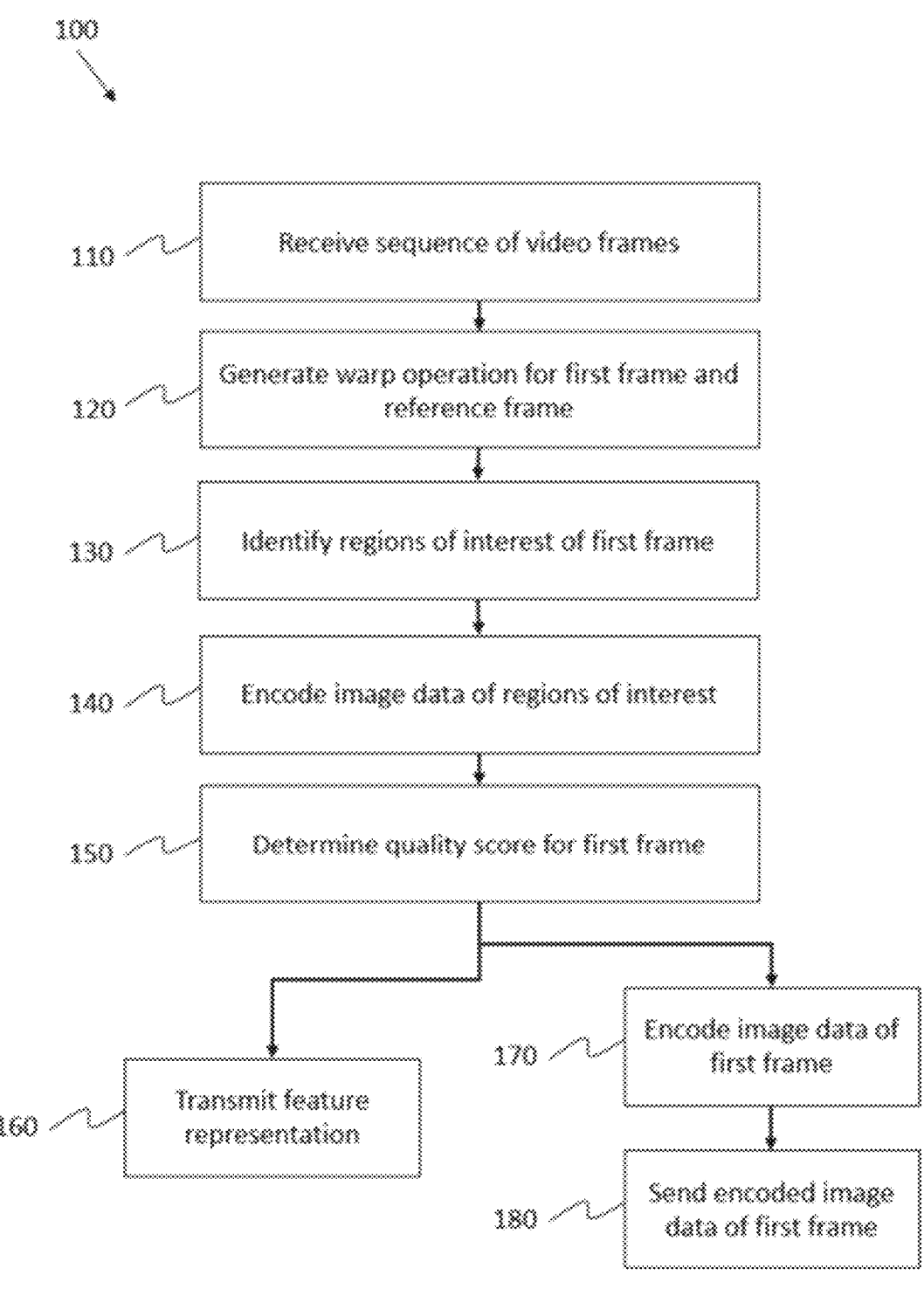
FIG. 10 is a flowchart showing the steps of a method of transmitting image data in accordance with embodiments.

FIG. 10 shows a method 100 of transmitting video data, for example using the hybrid encoder described above. The method 100 may be performed by a computing device. The method 100 may be performed at least in part by hardware and/or software. In embodiments, the method 100 is performed at least in part by an encoder apparatus. Such an encoder apparatus may be operable to send data to one or more decoders, e.g. via a wireless or wired network, and/or to store data in a storage medium.

First, a sequence of video frames is received (step 110). The video frames may be retrieved from storage (e.g. in a memory), or may be received from another entity (e.g. live camera feed, encoder apparatus, etc.). A warp operation for a first frame and a reference frame of the sequence of video frames is then determined (step 120). One or more regions of interest of the first frame are then identified (step 130) using any suitable method, and encoded image data is generated from the image data of the regions of interest, using a conventional image encoder (step 140). The warp operation and the encoded image data of the regions of interest together form a feature representation for the first frame. A quality score for the first frame is then determined (step 150). In embodiments, this is done by generating a reconstructed frame using the feature representation, and comparing it to the first frame. In other embodiments, a neural network is used to determine the quality score for the first frame, the neural network having been trained to do so. If the quality score is above a predetermined threshold, the feature representation for the first frame is transmitted (step 160). If on the other hand the quality score is below the predetermined threshold, the first frame is encoded using a conventional video encoder (step 170), and the encoded first frame is transmitted (step 180). The method is then repeated for each subsequent frame.

In alternative embodiments, the same steps as above are performed, except that no regions of interest are identified. In this case, necessarily there is no encoding of image data for such regions of interest, and the feature representations for the frames comprise only the warp operation.

In other alternative embodiments, the same steps as above are performed, except that no quality score is determined, and so the feature representation comprising the warp operation and the encoded image data of the regions of interest is always transmitted (except when an intra frame is necessarily transmitted, for example for the very first frame or after an encoder refresh).

The transmitted feature representations can be used to reconstruct the original video frames. FIG. 11 shows a method 200 of receiving video data, which may for example be video data that has been generated using the hybrid encoder described above. Similarly, the method 200 may be performed by a computing device, and at least in part by hardware and/or software. In embodiments, the method 200 is performed at least in part by a decoder apparatus.

First, video data is received (step 210), which comprises a sequence of feature representations for frames, each feature representation comprising a warp operation and encoded image data of regions of interest of the frame. The video data will also comprise at least one reference frame, received as an intra frame. These may be frames sent as required intra frames, where there is no suitable reference frame on which to base a feature representation, or they may be frames sent encoded by a conventional video encoder due to the reconstructed frame that would be obtained using a feature representation of the frame being determined to be of too low quality. The reference frames are decoded using a conventional video decoder (step 220). Using a warp engine, the warp operation and a decoded reference frame are used to construct a reconstructed frame (step 230). The encoded image data of the regions of interest is decoded using a conventional image decoder (step 240), and the decoded image data is blended into the reconstructed frame using a blending operation (step 250). This blended reconstructed frame can then be displayed (step 260).

In alternative embodiments, the video data received may comprise feature representations that comprise only warp operations, and not any encoded image data of regions of interest of the frame. In this case, the reconstructed frame constructed by the warp engine can be displayed, without any blending operation being performed.

In other alternative embodiments, the reference frame may be adapted to produce an adapted frame prior to the warp operation being applied to the reference frame, so that the warp operation is applied to the adapted frame. For example, one or more portions of image data within the reference frame may be replaced to produce the adapted frame. This allows video frames to be reconstructed, but with elements in the video changed. For example, by replacing an item of clothing shown in the reference frame with a new item of clothing, the new item of clothing will be present in the reconstructed frames in place of the original item.

FIG. 12 shows a method 300 of configuring an artificial neural network. Similarly, the method 300 may be performed by a computing device, and at least in part by hardware and/or software.

First, a training frame and a training reference frame are received (step 310). A warp operation for the training frame and the training reference frame is then generated (step 320), one or more regions of interest of the training frame are identified (step 330), and encoded image data is generated from the image data of the one of more regions of interest of the training frame using an image encoder (step 340).

Next, using a warp engine, the warp operation and the reference frame are used to construct a reconstructed frame (step 350), the encoded image data of the regions of interest is decoded using a conventional image decoder (step 360), and the decoded image data is blended into the reconstructed frame using a blending operation (step 370).

A quality score for the reconstructed training frame is then determined (step 380), for example by determining a similarity score between the training frame and the blended reconstructed frame, though it will be appreciated that any desired quality scoring method, including those discussed above, could be used. The artificial neural network is then trained using the training frame and the quality score (step 390).

In alternative embodiments, no regions of interest are used in the method.

Figure 13:
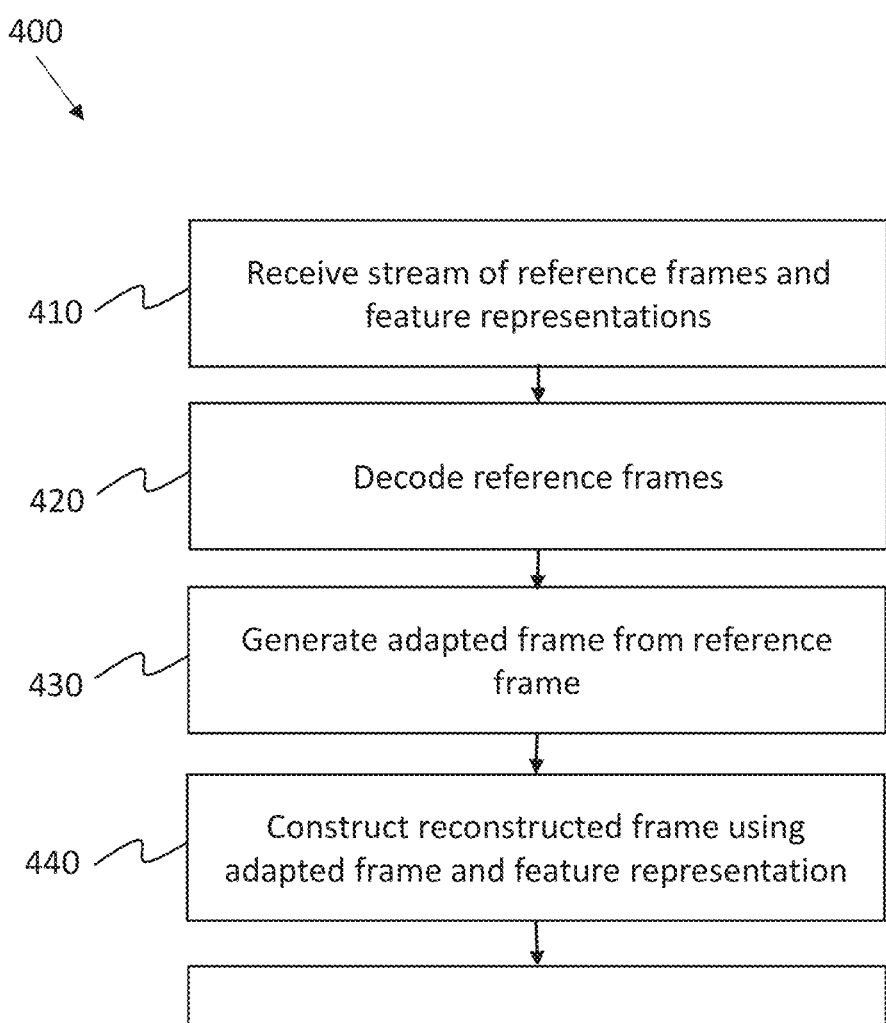
FIG. 13 is a flowchart showing the steps of a method of receiving image data in accordance with embodiments.

FIG. 13 shows a method 400 of receiving video data. Similarly, the method 400 may be performed by a computing device, and at least in part by hardware and/or software. In embodiments, the method 400 is performed at least in part by a decoder apparatus.

First, video data is received (step 410), which comprises a sequence of reference frames and feature representations for frames. Each feature representation comprises a warp operation. The reference frames are decoded using a conventional video decoder (step 420). An adapted frame is then generated from a reference frame (step 430). This may be done, for example, by changing an element in the reference frame, for example changing an item of clothing, its color, or any other desired change. The warp operation and the adapted frame are used to construct a reconstructed frame (step 440), which is then be displayed (step 450). In this way, the change made to the reference frame in the adapted frame will be present in all reconstructed frames generated using the adapted frame, for example the new item of clothing will be present in the reconstructed frames in place of the original item.

In embodiments, further changes may be applied to the reconstructed frame before it is displayed, for example if encoded image data for regions of interest is available, that could be blended into the reconstructed frame.

Figure 14:
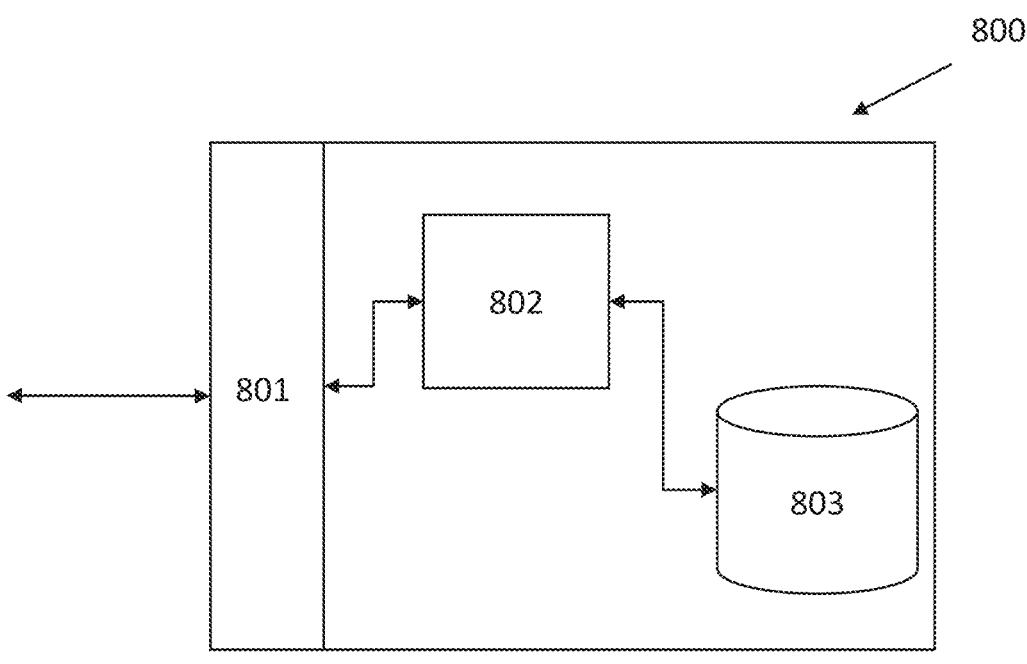
FIG. 14 is a schematic diagram of a computing device in accordance with embodiments.

Embodiments of the disclosure include the methods described above performed on a computing device, such as the computing device 800 shown in FIG. 14. The computing device 800 comprises a data interface 801, through which data can be sent or received, for example over a network. The computing device 800 further comprises a processor 802 in communication with the data interface 801, and memory 803 in communication with the processor 802. In this way, the computing device 800 can receive data, such as image data, video data, or various data structures, via the data interface 801, and the processor 802 can store the received data in the memory 803, and process it so as to perform the methods described herein, including processing image data and/or generating images.

Each device, module, component, machine or function as described in relation to any of the embodiments described herein may comprise a processor and/or processing system or may be comprised in apparatus comprising a processor and/or processing system. One or more aspects of the embodiments described herein comprise processes performed by apparatus. In some embodiments, the apparatus comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of the processes. The carrier may be any entity or device capable of carrying the program, such as a RAM, a ROM, or an optical memory device, etc.

While the present disclosure has been described and illustrated with reference to particular embodiments, it will be appreciated by those of ordinary skill in the art that the disclosure lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the disclosure that are described as preferable, advantageous, convenient or the like are optional and do not limit the scope of the independent claims. Moreover, it is to be understood that such optional integers or features, whilst of possible benefit in some embodiments of the disclosure, may not be desirable, and may therefore be absent, in other embodiments.

What is claimed is:

1. A method comprising:
receiving a sequence of frames;
determining a warp operation for a particular frame and a reference frame from the sequence of frames, wherein the warp operation defines a transformation of the reference frame to approximate the particular frame;
generating, using an encoder, encoded image data of one or more regions of interest of the particular frame;
generating a reconstructed frame using the encoded image data and the warp operation;
generating a score that reflects a similarity between the reconstructed frame and the particular frame;
determining that the score satisfies a threshold value; and
in response to determining that the score satisfies the threshold value, transmitting the reconstructed frame.

2. The method of claim 1, in response to determining that the score does not satisfy the threshold value, the method comprises:
generating, using an encoder, an encoded frame of the particular frame;
transmitting the encoded frame.

3. The method of claim 2, further comprising dynamically transmitting, for each frame of the sequence of frames, either the reconstructed frame or the encoded frame of a respective frame.

4. The method of claim 1, wherein generating the score that represents a similarity between the reconstructed frame and the particular frame comprises generating the score that represents the similarity between the reconstructed frame and the particular frame using at least one of a structural similarity index metric or a video multimethod assessment fusion method.

5. The method of claim 1, wherein the one or more regions of interest comprise at least one of an eye region or a mouth region of a face in the particular frame.

6. The method of claim 1, wherein generating, using an encoder, encoded image data of one or more regions of interest of the particular frame further comprises:
prior to using the encoder, generating another frame by replacing image data outside the regions of interest of the particular frame with default image data; and
generating the encoded image data by encoding the other frame with the encoder.

7. The method of claim 1, further comprising estimating, using a neural network, the score of the particular frame without generating the reconstruction frame.

8. A system comprising:
one or more computers and one or more storage devices on which are stored instructions that are operable, when executed by the one or more computers, to cause the one or more computers to perform operations comprising:
receiving a sequence of video frames;
determining a warp operation for a particular frame and a reference frame from the sequence of video frames, wherein the warp operation defines a transformation of the reference frame to approximate the particular frame;
generating, using an encoder, encoded image data of one or more regions of interest of the particular frame;
generating a reconstructed frame using the encoded image data and the warp operation;
generating a score that reflects a similarity between the reconstructed frame and the particular frame;
determining that the score satisfies a threshold value; and
in response to determining that the score satisfies the threshold value, transmitting the reconstructed frame.

9. The system of claim 8, in response to determining that the score does not satisfy the threshold value, the operations comprise:
generating, using an encoder, an encoded frame of the particular frame;
transmitting the encoded frame.

10. The system of claim 9, further comprising dynamically transmitting, for each frame of the sequence of frames, either the reconstructed frame or the encoded frame of a respective frame.

11. The system of claim 8, wherein generating the score that represents a similarity between the reconstructed frame and the particular frame comprises generating the score that represents the similarity between the reconstructed frame and the particular frame using at least one of a structural similarity index metric or a video multimethod assessment fusion method.

12. The system of claim 8, wherein the one or more regions of interest comprise at least one of an eye region or a mouth region of a face in the particular frame.

13. The system of claim 8, wherein generating, using an encoder, encoded image data of one or more regions of interest of the particular frame further comprises:

prior to using the encoder, generating another frame by replacing image data outside the regions of interest of the particular frame with default image data; and generating the encoded image data by encoding the other frame with the encoder.

14. The system of claim 8, further comprising estimating, using a neural network, the score of the particular frame without generating the reconstruction frame.

15. One or more non-transitory computer storage media encoded with computer program instructions that when executed by one or more computers cause the one or more computers to perform operations comprising:

receiving a sequence of video frames;

determining a warp operation for a particular frame and a reference frame from the sequence of video frames, wherein the warp operation defines a transformation of the reference frame to approximate the particular frame;

generating, using an encoder, encoded image data of one or more regions of interest of the particular frame;

generating a reconstructed frame using the encoded image data and the warp operation;

generating a score that reflects a similarity between the reconstructed frame and the particular frame;

determining that the score satisfies a threshold value; and in response to determining that the score satisfies the threshold value, transmitting the reconstructed frame.

16. The one or more non-transitory computer storage media of claim 15, in response to determining that the score does not satisfy the threshold value, the operations comprise:

generating, using an encoder, an encoded frame of the particular frame;

transmitting the encoded frame.

17. The one or more non-transitory computer storage media of claim 16, further comprising dynamically transmitting, for each frame of the sequence of frames, either the reconstructed frame or the encoded frame of a respective frame.

18. The one or more non-transitory computer storage media of claim 15, wherein generating the score that represents a similarity between the reconstructed frame and the particular frame comprises generating the score that represents the similarity between the reconstructed frame and the particular frame using at least one of a structural similarity index metric or a video multimethod assessment fusion method.

19. The one or more non-transitory computer storage media of claim 15, wherein the one or more regions of interest comprise at least one of an eye region or a mouth region of a face in the particular frame.

20. The one or more non-transitory computer storage media of claim 15, wherein generating, using an encoder, encoded image data of one or more regions of interest of the particular frame further comprises:

prior to using the encoder, generating another frame by replacing image data outside the regions of interest of the particular frame with default image data; and generating the encoded image data by encoding the other frame with the encoder.

* * * * *